US012570231B2

(12) United States Patent
Tirla

(10) Patent No.: US 12,570,231 B2
(45) Date of Patent: Mar. 10, 2026

(54) METHOD AND DEVICE FOR PERFORMING A CHECKING OF A PERSON BY MEANS OF INFRARED RADIATION AS WELL AS A MOTOR VEHICLE HAVING SAID DEVICE

(71) Applicant: CARIAD SE, Wolfsburg (DE)

(72) Inventor: Octavian Tirla, Berlin (DE)

(73) Assignee: Cariad SE, Wolfsburg (DE)

( * ) Notice: Subject to any disclaimer, the term of this patent is extended or adjusted under 35 U.S.C. 154(b) by 0 days.

(21) Appl. No.: 18/486,856

(22) Filed: Oct. 13, 2023

(65) Prior Publication Data

US 2024/0123931 A1 Apr. 18, 2024

(30) Foreign Application Priority Data

Oct. 18, 2022 (DE) .......................... 102022127175.7

(51) Int. Cl.
*B60R 21/015* (2006.01)
*G01S 17/08* (2006.01)

(52) U.S. Cl.
CPC .. *B60R 21/01552* (2014.10); *B60R 21/01534* (2014.10); *B60R 21/01538* (2014.10); *B60R 21/01566* (2014.10); *B60R 2300/205* (2013.01); *B60R 2300/8006* (2013.01); *G01S 17/08* (2013.01)

(58) Field of Classification Search
CPC ........ B60R 21/01552; B60R 21/01534; B60R 21/01538; B60R 21/01566; B60R 2300/205
See application file for complete search history.

(56) References Cited

U.S. PATENT DOCUMENTS

| | | | | |
|---|---|---|---|---|
| 5,689,619 A * | 11/1997 | Smyth | ................ | G02B 27/0093 706/45 |
| 7,568,802 B2 * | 8/2009 | Phinney | ................. | G06V 40/19 382/117 |
| 9,395,562 B1 * | 7/2016 | Nguyen | .................. | A61B 3/111 |
| 10,701,350 B1 * | 6/2020 | Ebert | ................... | A61B 3/0075 |
| 2002/0181742 A1 * | 12/2002 | Wallace | .................. | G06T 7/254 382/104 |
| 2009/0250593 A1 * | 10/2009 | Orlewski | .......... | B60R 21/01538 250/206 |
| 2016/0041384 A1 * | 2/2016 | Robbins | .................. | G06F 3/013 359/630 |
| 2016/0270655 A1 * | 9/2016 | Caraffi | .................. | A61B 3/0025 |
| 2017/0060828 A1 * | 3/2017 | Rainisto | ............... | G06F 40/169 |
| 2017/0336222 A1 * | 11/2017 | Yamaguchi | ........ | G02B 27/0101 |
| 2018/0050636 A1 * | 2/2018 | Espig | ........................ | B60R 1/23 |
| 2018/0184893 A1 * | 7/2018 | Sahler | .................... | A61B 3/032 |
| 2018/0218713 A1 * | 8/2018 | Kusanagi | ............... | B60Q 9/008 |
| 2022/0172489 A1 * | 6/2022 | Wieczorek | .......... | B60N 2/0025 |

FOREIGN PATENT DOCUMENTS

| | | | |
|---|---|---|---|
| DE | 102014216053 A1 | 2/2016 |
| EP | 3895616 A1 | 10/2021 |

OTHER PUBLICATIONS

Health Hazard Evaluation Report HETA 98-0224-2714 by the National Institute for Occupational Safety and Health NIOSH. Retrieved from URL https://www.cdc.gov/niosh/hhe/reports/pdfs/1998-0224-2714.pdf (Year: 2018).*

* cited by examiner

*Primary Examiner* — Valentin Neacsu
(74) *Attorney, Agent, or Firm* — Seed Intellectual Property Law Group LLP

(57) ABSTRACT

A method for performing a checking of a person, such as a vehicle passenger, by way of infrared radiation involves determining the distance between a source of infrared radiation and the person by way of light according to a distance definition and setting the intensity of the infrared radiation in dependence on the distance as determined.

9 Claims, 1 Drawing Sheet

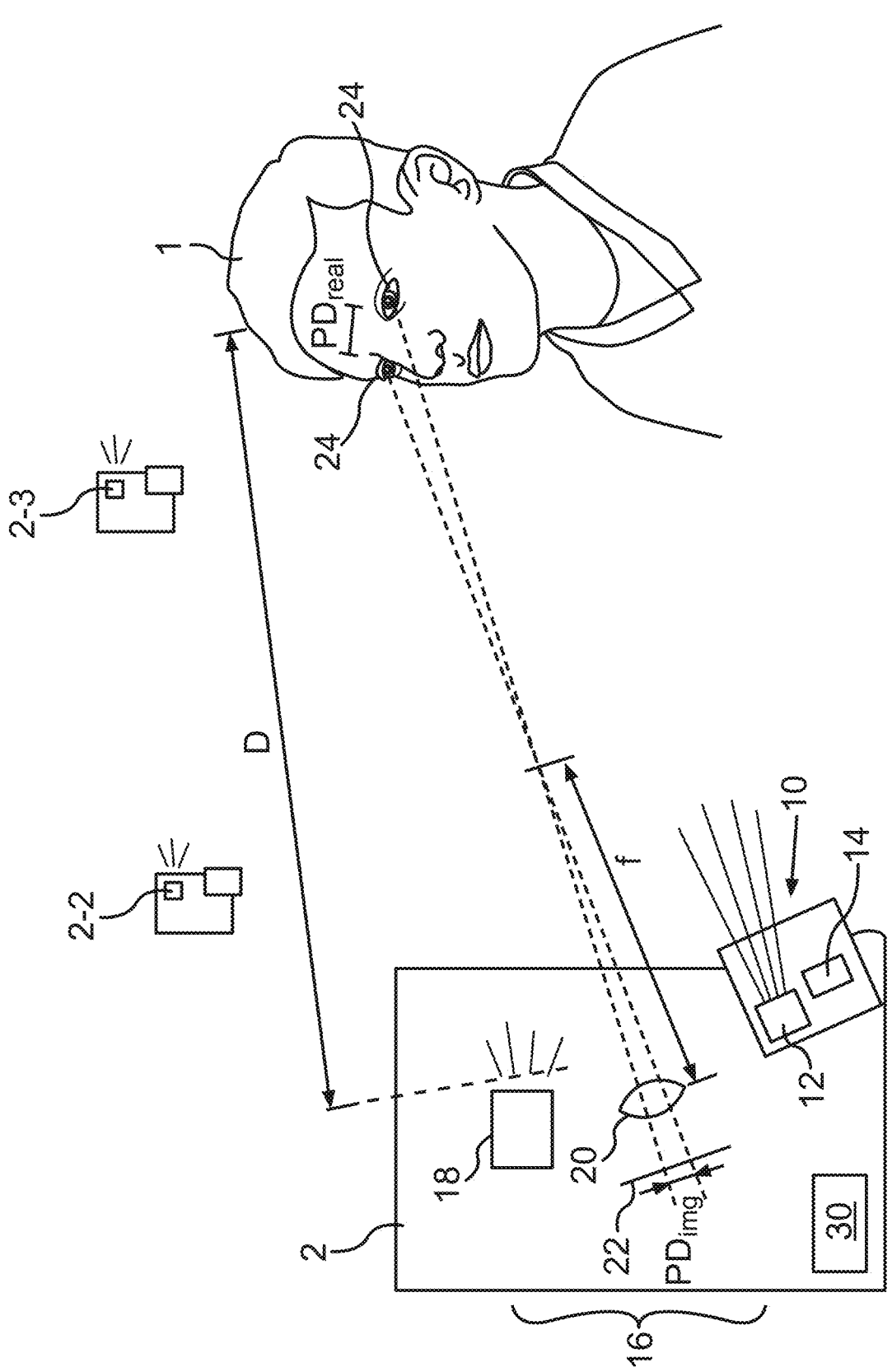

METHOD AND DEVICE FOR PERFORMING A CHECKING OF A PERSON BY MEANS OF INFRARED RADIATION AS WELL AS A MOTOR VEHICLE HAVING SAID DEVICE

BACKGROUND

Technical Field

Embodiments of the invention relate to a method for performing a checking of a person, especially a vehicle passenger, by way of infrared radiation.

Description of the Related Art

It is known how to perform such checks. The goal may be to detect a viewing direction of the person in order to put out control commands adapted to this. With the aid of the viewing direction, it is possible to establish, for example, the position of a head-up display. With the aid of the viewing direction and/or additionally with the aid of a measured length of the closing of the eyes and/or the frequency of closing the eyes per moment of time and possibly other metered values, it can be inferred that the person (especially the driver) is fatigued, and a warning signal can be put out accordingly to make the driver himself aware of his condition (e.g., display (light) in the dashboard). Optionally, a driving blockage can also be initiated (limiting of the speed, or complete disabling of the continued driving).

Thus, in this case, the vehicle passenger is exposed to infrared radiation, which carries the risk, if the intensity of the infrared radiation is too high, of damaging tissues, first and foremost the eyes may be injured by thermal radiation.

In this regard, DE 10 2014 216 053 A1 discloses an infrared source which may selectively emit infrared radiation of different wavelengths. A device measures the infrared radiation which is naturally present in any case and then selects for the infrared radiation source the wavelength based on the intensity of the infrared radiation present without the infrared radiation source.

EP 3 895 616 A1 discloses controlling the intensity of an infrared radiation source. In this regard, it is described that the distance from the object can also be measured by way of the infrared radiation and the emitted radiation power can be adapted so that the person is not excessively exposed. The drawback here is that infrared light is already used for the distance measurement as such and this can already be harmful in itself.

BRIEF SUMMARY

Embodiments disclosed herein indicate a way of better protecting a person in a motor vehicle against health impairments due to infrared radiation.

According to an embodiment, a method for performing a checking of a person, especially a vehicle passenger, by way of infrared radiation may involve determining the distance D between a source of infrared radiation and the person by way of light according to a distance definition and setting the intensity of the infrared radiation in dependence on the distance D as determined.

The use of light, i.e., electromagnetic radiation in the range of those wavelengths which are basically visible to the human eye, has the advantage for measurements, as compared to the use of infrared radiation, that the human eye is better adapted to the wavelengths of light (since the wavelengths are shorter than those of infrared radiation) and thus better protected against heat input when measuring distance.

The present disclosure states that preferably the device having the source of infrared radiation also comprises a light source and an optical camera, such that the light source puts out light pulses and the camera detects the light of the light pulses reflected back from the person. The providing of the separate light source has the advantage that the detection of the distance is not dependent on the natural presence of light, such as at night or in partial darkness ("sundown"), and the measurement can also be done in a defined manner, given the wavelength composition of the light put out by the light source. This embodiment is also advantageous in that the distance can be related in defined manner to the source of infrared radiation. The feature that the light source puts out light pulses prevents a dazzling, or too strong a dazzling, of the vehicle passenger by the light source.

Further, in some embodiments, the light pulses have a duration not longer than $\frac{1}{30}$ second, preferably not longer than $\frac{1}{40}$ second, further preferably not longer than $\frac{1}{50}$ second, and especially preferably not longer than $\frac{1}{60}$ second. Given low intensity of the light pulses, such flashes are not visible to the person or are barely visible and therefore cause little or no disturbance. In particular, this prevents the motor vehicle driver from being impaired.

According to one preferred embodiment, the camera determines and defines the distance D of the person with the aid of the pupillary distance ("$PD_{img}$") of the eyes on an image sensor device of the camera as: $D=f \times PD_{min}/PD_{img}$, where f is the focal length of the camera and PDmin is a constant. (The formula represents an exemplary embodiment of the above given distance definition.)

PDmin can indicate in particular the minimum pupillary distance. The minimum pupillary distance for women is 51 mm, the minimum pupillary distance for men is 53 mm. $PD_{min}$ can either be set at the value of 51 mm ($\pm 0.3$ mm) or it can be determined by analysis methods (image recognition methods) in the motor vehicle, whether the person is male or female and accordingly the value can be set at 51 mm ($\pm 0.3$ mm) for a woman and 53 mm ($\pm 0.3$ mm) for a man.

According to another preferred embodiment, the maximum intensity ("$E_{IL}$") of the infrared radiation, especially when the infrared source is a light-emitting diode, is determined as:

$$E_{IL} < 100 \text{ W/m}^2 \times D/20 \text{ mm.}$$

A corresponding value is established by standards (e.g., IEC-62471, "Photobiological safety of lamps and lamp systems"). If the limit values should be made more strict, the method can accordingly adapt the maximum intensity $E_{IL}$: thus, for example, a corresponding controller can be programmed to change the maximum intensity $E_{IL}$.

The device may comprise an infrared source, an optical camera situated at the infrared source, and a light source, as well as a controller, which brings about a shining of the light source on the person, for which the camera takes a picture, and the picture is used to determine the distance D of the person from the infrared source according to a distance definition. Moreover, the controller establishes the electric power of the infrared source and/or the radiation intensity put out by the infrared source in dependence on the distance D as determined. The radiation intensity is established at least indirectly in terms of the electric power, for example through a calibration table or a calibration curve. The controller can also establish the radiation intensity directly through the control commands. In some embodiments, regulation can be provided in addition by way of an infrared sensor or the like.

The light source may comprise a vertical-cavity surface-emitting laser (VCSEL). Such lasers enable the pulsing already described above as being advantageous and put out a defined light, which is especially easy to analyze.

The motor vehicle according to the disclosure may comprise the device according to the disclosure.

In some embodiments, the device for checking the viewing direction of a person adjusts a head-up display in dependence on the detected viewing direction (tilting of the head and/or gaze as detected by way of eye tracking). A device for checking the driving ability of a vehicle driver may be provided, and the motor vehicle may comprise a device of this kind for warning the vehicle driver (or other vehicle passengers), and/or to carry out a driving blockage at least partially (e.g., speed limitation, or permission to drive only a limited distance up to an immediate stop).

The device for performing a checking in the motor vehicle may comprise multiple units, each having an infrared source, the units being situated at different locations and/or different components of the vehicle. In embodiments containing such device, especially precise measurements may be made, for example with respect to the viewing angle, and also the measurement range can be widened (driver looking in extreme directions). The use of a plurality of such infrared sources may be made possible, among other things, by the fact that the distance of the particular unit from the person may be determined by way of the respective associated light sources and the optical camera at each of the infrared sources, and the intensities of the individual infrared sources may be attuned to each other in order to keep the total energy input below a limit.

An error message and/or a request to enter a user feedback may be outputted, and/or a standard setting and/or a predetermined initial state will be established.

A control device for the motor vehicle is also disclosed herein. The control device may comprise a data processing device or a processor device which is configured to carry out the method according to this disclosure. The processor device may comprise at least one microprocessor, at least one microcontroller, at least one FPGA (Field Programmable Gate Array), and/or at least one DSP (Digital Signal Processor). Furthermore, the processor device may comprise program code which is configured to carry out the method according to this disclosure when executed by the processor device. The program code may be stored in a data storage of the processor device. The processor circuit of the processor device may comprise, e.g., at least one circuit board and/or at least one SoC (System on Chip).

In some embodiments, the method may comprise features as were already described in connection with the modifications of the vehicle as described above. For this reason, the corresponding modifications of the method as described above will not be described here once more.

The motor vehicle according to the disclosure may preferably be designed as an automobile, especially a passenger car or a truck, or as a personal bus or motorcycle.

In some embodiments, the device may further comprise a computer-readable storage medium, containing program code which, when executed by a processor circuit of a computer or a cluster of computers, causes them to carry out an embodiment of the method as described herein. The storage medium may be provided, at least partly for example, as a nonvolatile data storage (such as a flash memory and/or as an SSD—solid state drive) and/or at least partially as a volatile data storage (such as a RAM—random access memory). The storage medium may be located in the processor circuit in its data storage. However, the storage medium may also be operated for example as a so-called "appstore" server on the Internet. A processor circuit with at least one microprocessor may be provided by the computer or the computer cluster. The program code may be provided as binary code or Assembler, as source code of a programming language (such as C), and/or as program script (such as Python).

Some embodiments may comprise the combinations of the features of the described embodiments. Thus, some embodiments may comprise realizations having a combination of the features of several of the described embodiments, as long as the embodiments were not described as being mutually exclusive.

BRIEF DESCRIPTION OF THE SEVERAL VIEWS OF THE DRAWINGS

The FIGURE shows a device in relation to one person.

DETAILED DESCRIPTION

In the following exemplary embodiments, the components which are described for the embodiments each constitute individual features, to be considered independently of each other, and which also modify device and/or method described herein independently of each other. Therefore, the device and/or method may comprise combinations other than the presented combinations of features. Moreover, the described embodiments may also be amplified with other features of the already described features of the device and/or method described herein.

The device and/or method described herein is especially relevant to a motor vehicle, which is not shown in the FIGURE, but may be thought of as an external frame. In theory, the device and/or method may also be used outside of motor vehicles.

A vehicle passenger 1, here for example the vehicle driver, may be monitored by way of a device 2 for performing a checking of a person by way of infrared radiation. The device 2 may comprise an infrared unit 10 having an infrared radiation source 12 and an infrared sensor 14, the latter preferably in the form of an infrared camera.

In some embodiments, the device 2 may additionally be equipped with an optical unit 16. The optical unit 16 may a light source 18, which may be configured to beam light (electromagnetic radiation in the visible range) onto the person 1. In particular, the light source 18 may be a vertical-cavity surface-emitting laser (VCSEL) or also a light-emitting diode or multiple light-emitting diodes (e.g., six light-emitting diodes in an array). In some embodiments, the light source 18 emits pulsed light with a frequency of $\frac{1}{60}$ second, and of such intensity that the vehicle passenger 1 does not or hardly notices the radiation.

The light source 18 may be used to determine the distance D between the device 2 (preferably in particular referred to the infrared source 12) and the eyes 24 of the vehicle passenger 1. The device 2 may also comprise in the optical unit 16 a camera having one or more lenses, the latter as a lens system. Only a single lens 20 is illustrated in the FIGURE. The camera may also comprise an optical sensor 22. The lens 20 or the lens system may have a focal length f. Accordingly, a picture of the person 1 may be taken in the plane of the optical sensor 22. The pupillary distance of the person 1 may become the distance $PD_{img}$ on the optical sensor. To determine the real pupillary distance $PD_{real}$ of the person 1 the following equation may be used:

$$PID_{real}/PD_{img}=(D+f)/f,$$

which may be approximated for a typically small f:

$$PD_{real}/PD_{img}=D/f.$$

Using the determined $PD_{real}$, the distance D may be determined. In the method described herein, the real pupillary distance $PD_{real}$ may be known to the device 2.

For simplicity, however, one may start from a minimum pupillary distance $PD_{min}$, which is typically 51 mm for women and 53 mm for men. The distance determined by the equation:

$$D_{min}=PD_{min}\times f/PD_{img}$$

can then be used here as D, $$D:=D_{min},$$

for the purpose of the method described herein, to define the intensity of the infrared radiation emitted by the infrared source 12. (The distance D may be determined by the indicated formulas. The method may ultimately average the distance of the individual eyes 24 of the person 1.) The controlling of the light source 18 and corresponding evaluation of the measurements by the optical sensor 22, on the one hand, and the calculation of the distance D and the corresponding actuating of the infrared source 12 and also the later evaluation of the sensor measured values of the sensor 14, on the other hand, may be performed by a controller 30 in the device 2. Alternatively, a suitable controller may also be provided outside the device.

The controller 30 may ensure that the infrared source is operated such that the intensity ("$E_{IL}$") of the infrared radiation emitted remains less than $100 \text{ W/m}^2\times D/20$ mm. This corresponds to a standard for light-emitting diode light at longer emission times: the switched-off energy should be less than $100 \text{ W/m}^2$ for a distance of 20 mm from the light source.

In general, the equation:

$$E_{IL}<e\times D/d,$$

is provided where e by default (standards or the like) is the maximum permissible energy for the distance d.

In some embodiments, such as the embodiment shown in the FIGURE, multiple devices 2, namely also the devices 2-2 and 2-3, may be included. If the devices are numbered consecutively (i=1, 2, 3 etc.), the respective distance $D_i$ may be determined, where $D_i$ is the distance of the i-th device from the eyes 24 of the person 1. It is then possible to coordinate the output of infrared radiation of the individual devices 2, 2-2, 2-3, for example by a master controller (where this task can be undertaken, for example, by the controller 30 of the device 2). It should then be the case that the maximum intensity $E_{IL}$ (i) put out by the i-th device or its infrared source 12 furnishes a contribution such that the sum is less than the above described limit, as shown by the equation:

$$\Sigma_{i=1}^{N}EIL(i)EILmax.$$

For example, given the same contribution of the infrared light arriving at the person 1 when there are N devices 2-1, 2-2, 2-3, . . . 2-N, it can be provided that:

$$E_{IL}(i)<100 \text{ W/m}^2\times 1/20 \text{ mm}\times(D_i)/\Sigma_{i=1}^{N}Di.$$

In summary, the embodiments provided show how a protection of the eyes against radiation energy may be provided by determination of the distance of optical sensors.

German patent application no. 10 2022 127175.7, filed Oct. 18, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for performing a checking of a person by infrared light, comprising:
    determining a respective distance between each source of infrared radiation of a plurality of sources of infrared radiation and the person by way of light according to a distance definition, wherein at least one source of infrared radiation of the plurality of sources of infrared radiation is configured such that an output of the at least one source of infrared radiation is adjustable;
    detecting a viewing direction of the person;
    checking the driving ability of the person, the person being a vehicle driver of a motor vehicle; and
    operating the at least one source of infrared radiation of the plurality of sources of infrared radiation based on the determined distances such that the maximum intensity of the sum of the infrared radiation of the plurality of sources of infrared radiation delivered to a position of the person is less than $100 \text{ W/m}^2$ per 20 mm of the determined distances,
    wherein the motor vehicle comprises a head-up display configured to adjust based on the viewing direction.

2. The method according to claim 1, wherein a device having the plurality of sources of infrared radiation further comprises a light source and an optical camera, wherein the light source emits light pulses and the optical camera detects light of the light pulses reflected back from the person.

3. The method according to claim 2, wherein the light pulses have a duration not longer than $\frac{1}{30}$ second.

4. The method according to claim 2, further comprising determining the distance, by the camera, based on a pupillary distance of eyes of the person on an image sensor device of the camera, a focal length of the camera, and a constant minimum pupillary distance.

5. The method according to claim 1, wherein each source of the plurality of sources of infrared radiation comprises a light-emitting diode.

6. A device for performing a checking of a person, comprising:
    a plurality of infrared sources, a light source situated at each infrared source of the plurality of infrared sources, an optical camera, and a controller, wherein the controller is configured to illuminate the light source on the person, wherein the controller is configured to determine a respective distance of the person from each infrared source according to a distance definition based on a picture taken by a camera, and wherein the controller is configured to establish the electric power of the infrared sources and/or the radiation intensity put out by the infrared sources based on the distances; and
    a device for detecting a viewing direction of the person, wherein a motor vehicle including the device for performing the checking of the person comprises a head-up display configured to adjust based on the viewing direction, wherein the device for performing the checking of the person is configured to check the driving ability of a vehicle driver, wherein at least one infrared source of the plurality of infrared sources is configured such that an output of the at least one infrared source is adjustable, and wherein the at least one infrared source of the plurality of infrared sources is configured to be operated based on the determined distances such that the maximum intensity of the sum of the infrared radiation of the plurality of infrared sources delivered to a position of the person is less than 100 $W/m^2$ per 20 mm of the distance.

7. The device according to claim 6, wherein the light source comprises a vertical-cavity surface-emitting laser.

8. The device according to claim 6, wherein the motor vehicle comprises a warning device and/or a device for providing an at least partial driving blockage, wherein the warning device and/or the device for providing the at least partial driving blockage are configured to be activated based on the driving ability of the vehicle driver.

9. The device according to claim 6, wherein each infrared source is situated at different locations and/or different components of the motor vehicle.

\* \* \* \* \*